Sept. 23, 1947.　　C. W. PETERSON　　2,427,690
LIQUID MEASURING SYSTEM
Filed Nov. 26, 1945　　2 Sheets-Sheet 1

INVENTOR
CARL W. PETERSON
BY
Ralph L. Chappell
ATTORNEY

Sept. 23, 1947.  C. W. PETERSON  2,427,690
LIQUID MEASURING SYSTEM
Filed Nov. 26, 1945  2 Sheets-Sheet 2

INVENTOR
CARL W. PETERSON
BY
*Ralph L. Chappell*
ATTORNEY

Patented Sept. 23, 1947

2,427,690

UNITED STATES PATENT OFFICE 2,427,690

LIQUID MEASURING SYSTEM

Carl W. Peterson, Bremerton, Wash.

Application November 26, 1945, Serial No. 630,961

4 Claims. (Cl. 73—302)

(Granted under the act of March 3, 1883, as amended April 30, 1928; 370 O. G. 757)

This invention relates to liquid measuring systems and controls therefor and more particularly to such systems in which fluid gauges are employed for measuring or indicating levels or quantities of liquids present in tanks or other containers.

Measuring or indicating systems of the type referred to commonly comprise a U-tube gauge adapted to receive an indicating fluid and primary conduit means that connect an arm of the gauge tube with the bottom of a tank or other container adapted to receive a supply of liquid. Secondary conduit means are usually provided to connect the opposite arm of the tube with the top of the tank to compensate for any additional pressures above atmospheric pressure that may exist above the liquid so that the pressure at the bottom of the tank represents only that caused by the weight of liquid thereover. The difference in pressure between the top and bottom of the tank varies with the depth of liquid present in the tank; the difference in height of the indicating fluid in the arms of the tube varies with the difference in pressure. Thus, when the tube is properly calibrated, it is possible to ascertain the level of liquid present in the tank by observation of the level of fluid in an arm of the tube.

In order to obtain an accurate reading, it is necessary to blow or flush the primary conduit, preferably with a stream of air, immediately prior to taking the reading. Such flushing drives out of the conduit any liquid or foreign material that may have collected therein and fills the conduit with air so that the pressure of the liquid in the tank acting on the bottom of the conduit represents the pressure of the full depth of liquid present. For similar reasons, when a secondary conduit is employed in the system, it is also desirable to flush the secondary conduit in the same manner.

Objects of the present invention are to provide measuring systems of the type referred to in which improved control means are employed for selectively connecting the primary conduit with a source of air under pressure to blow or flush said conduit and simultaneously venting both sides of the gauge tube, for connecting the secondary conduit with the source of air under pressure to blow or flush said secondary conduit, for opening the conduits to the arms of the gauge tube in order that a reading may be taken, or for closing the arms of the gauge tube and the conduits; to provide improved controls for measuring systems of the type referred to in which means are employed for automatically venting both sides of the gauge tube while the primary conduit is being flushed; to provide improved controls that automatically place the gauge tube at a zero reading before the reading is taken of the level of the liquid in the container and that eliminate the chance of blowing the indicating fluid out of the gauge tube during the blowing or flushing operation; and to provide for carrying out the foregoing objects in a facile, economical and efficient manner.

In accomplishing these and other objects of the present invention, I have provided improved details of structure, the preferred form of which is illustrated in the accompanying drawings, wherein.

Figure 3:
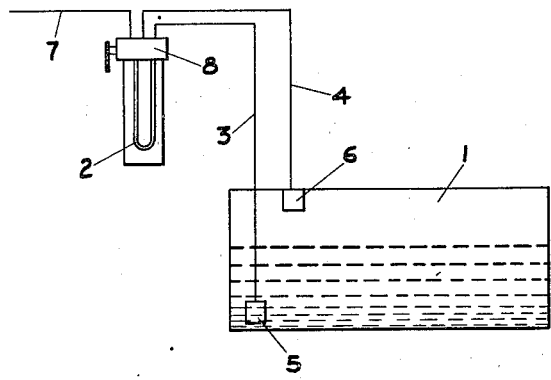
Fig. 3 is a diagrammatic view of a measuring system embodying the features of the present invention.

Referring more in detail to the drawings:

In Fig. 3 there is illustrated diagrammatically a typical installation in which may be employed a measuring system and control therefor embodying the features of the present invention. The installation includes a tank or other container 1, a U-tube gauge 2, described in detail hereinafter, a primary conduit 3 connecting one arm of the U-tube with the bottom of the tank, and a secondary conduit 4 connecting the other arm of the U-tube with the top of the tank. Preferably an air bell 5, of known design, is connected to the end of the primary conduit 3 adjacent the bottom of the tank and an equalizer chamber 6, also of known design, is connected to the end of the secondary conduit 4 adjacent the top of the tank. The gauge contains a suitable indicating fluid, commonly alcohol or mercury.

The pressure of the liquid in the tank, acting on the air bell 5, forces the indicating fluid to rise to a higher level in one arm of the U-tube than in the other, and such difference in height is a measure of the level of the liquid present in the tank. When the secondary conduit and equalizer chamber 6 are employed, as herein illustrated, any additional pressures at the top of the tank are compensated so that the effective pressure on the air bell is proportional only to the depth of liquid present thereabove.

Prior to taking a reading of the level of liquid present in the tank, it is necessary to flush the primary conduit 3 with a stream of air or other gas to blow out any liquid or other foreign material that may be present therein and fill the conduit with air. When the secondary conduit is employed, as herein illustrated, it is desirable also to flush said secondary conduit. A pressure conduit 7, connected with a suitable source of air under pressure, not shown, is provided for conveniently flushing the primary and secondary conduits.

A control 8, described in detail hereinafter, is provided for selectively connecting the pressure conduit 7 to the primary and secondary conduits 3 and 4, or connecting the arms of the U-tube to the primary and secondary conduits while closing the pressure conduit, or closing all of the conduits and the arms of the U-tube.

Figure 1:
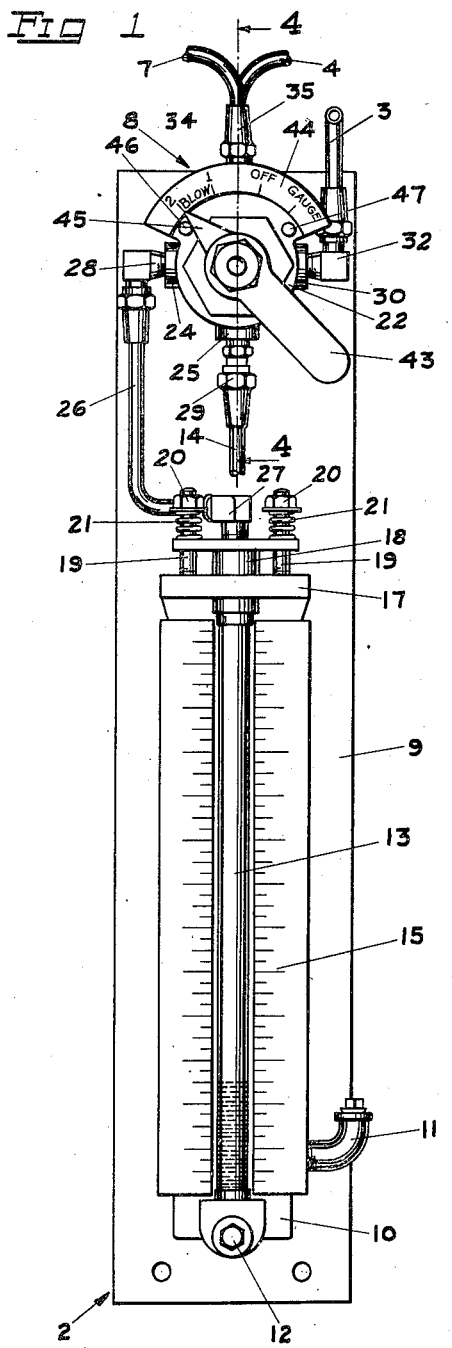
Fig. 1 is a front elevational view of a gauge and control preferably employed in measuring systems embodying the features of the present invention.
Figure 2:
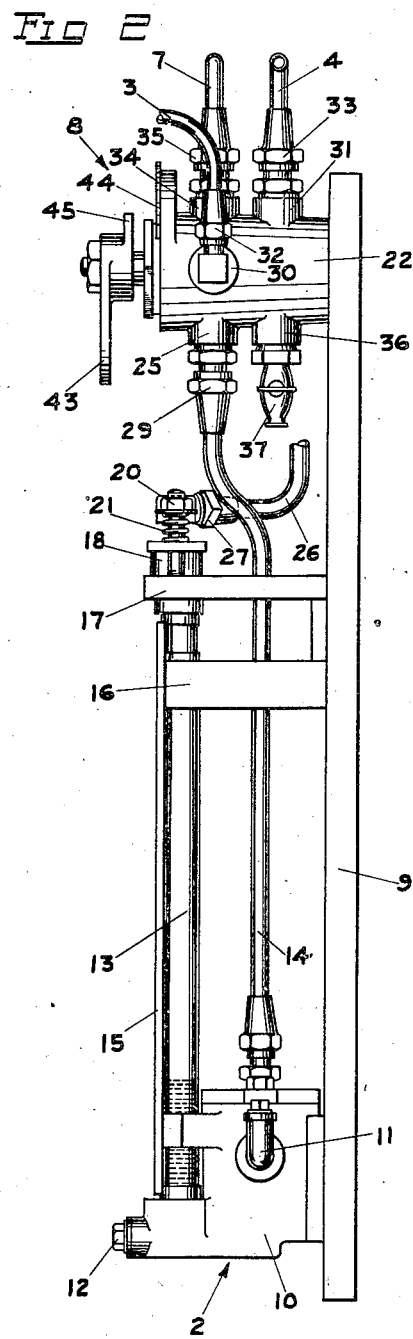
Fig. 2 is a side elevational view of the gauge and control shown in Fig. 1.

Figs. 1 and 2 illustrate in detail the structure of the gauge 2 preferably employed in the system. Preferably the gauge and control are mounted on a common backing member 9 with the control positioned immediately above the gauge.

The gauge comprises a reservoir 10 secured to the backing member 9 preferably adjacent the lower end thereof. The reservoir has a fitting 11 secured thereto through which it may be filled and a drain plug 12. A front upright tube 13 of transparent material and a rear upright tube 14 (Fig. 2) communicate with the reservoir through suitable fittings and constitute the arms of the U-tube. One or more graduated scale members 15 are positioned adjacent the front tube 13. The upper end portions of the scale members and upright tubes are preferably supported or retained by a bracket 16 fixed to the backing member 9. A gland block 17 is preferably fixed to said backing member above said bracket and carries a gland 18 connected to the front upright tube 13. The gland is preferably held in engagement with the tube by bolts 19 which pass through apertures in the gland block and through apertures formed in suitable flanges on the gland and are retained in position by nuts 20 and springs 21.

Figure 4:
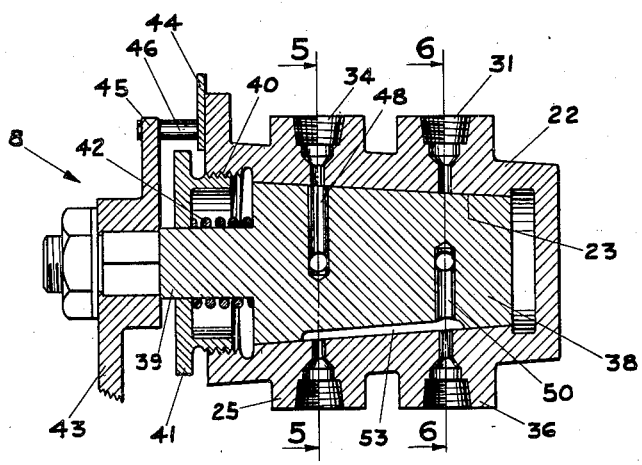
Fig. 4 is a vertical sectional view of the control mechanism taken substantially on the line 4—4 of Fig. 1.
Figure 5:
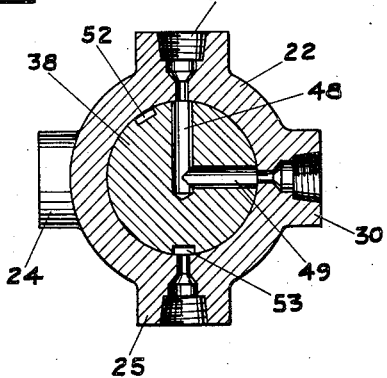
Fig. 5 is a vertical sectional view of the control mechanism taken substantially on the line 5—5 of Fig. 4.
Figure 6:
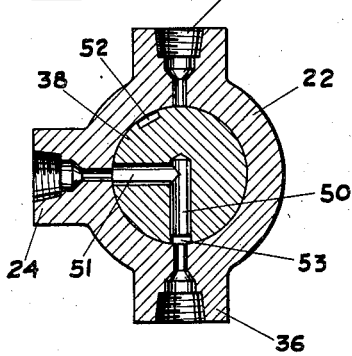
Fig. 6 is a vertical sectional view of the control mechanism taken substantially on the line 6—6 of Fig. 4.

Figs. 4, 5 and 6 illustrate in detail the structure of the control 8 preferably employed in the system. The control comprises a housing 22 having a central bore 23, preferably tapered inwardly (Fig. 4) and a plurality of radial ports with which the various conduits and tubes hereinbefore described are connected.

First and second ports 24 and 25 in the housing are connected with the upper ends of the upright tubes 13 and 14, respectively. The connection to the front upright tube 13 is preferably through a line 26 connected to the gland 18 by a fitting 27 and to the housing 22 by a fitting 28, Fig. 1. The rear upright 14 is preferably connected to the housing 22 at the port 25 by use of a suitable fitting 29.

Third and fourth ports 30 and 31 are provided in the housing for connection to the primary and secondary conduits 3 and 4, respectively, suitable fittings 32 and 33 being provided at the connections, Fig. 2.

A fifth port 34 is provided in the housing diametrically opposite the port 25 and the pressure conduit 7 is connected thereto by use of a suitable fitting 35. A sixth port 36 is provided in the housing diametrically opposite the port 31 to function as a vent and is preferably equipped with a suitable petcock 37 of known design.

Preferably the ports are arranged in the housing in the manner illustrated in the drawings. That is, the ports 25 and 34, connected with the rear upright tube 14 and the pressure conduit 7, respectively, are at the top and bottom of the housing in the front portion thereof; the port 30, connected with the primary conduit 3, is at the right hand side of the housing and is in the same transverse plane as the ports 25 and 34; the ports 31 and 36, connected with the secondary conduit 4 and the petcock 37, respectively, are at the top and bottom of the housing in the rearward portion thereof; and the port 24, connected with the front upright tube 13, is at the left hand side of the housing and is in the same transverse plane as the ports 31 and 36. It is obvious, however, that numerous other arrangements could be provided that would be operative equivalents of the arrangement illustrated. Therefore, I do not wish to be limited to the particular arrangement shown.

A complementary plug 38 is fitted within the bore 23 in the housing and is rotatable therein to set the control to its various connecting positions. The plug preferably carries a stem 39. The bore 23 preferably has a counterbored and tapped outer portion 40 within which a bushing 41 is threadedly engaged. The bushing has an aperture in its face for passage of the stem 39. A compression spring 42 preferably surrounds the stem 39 between the bushing and the body of the plug to hold the plug in tight engagement with the bore.

Externally of the bushing, the stem is equipped with an operating handle 43. The housing 22 preferably carries an indicator plate 44 on which is marked the different connection settings possible with the control. The handle carries a pointer 45 cooperable with the indicator plate to indicate the setting to which the control is adjusted.

Preferably a pair of stop pins 46 and 47 are secured to the front face of the housing and are cooperable with the pointer to limit rotary movement of the handle and plug.

The plug 38 has intersecting radial bores 48 and 49 substantially perpendicular to each other in its forward portion and coplanar with the ports 25, 30 and 34, while similar bores 50 and 51 are formed in the rearward portion of said plug coplanar with the ports 24, 31 and 36 and angularly removed 180° from the bores 48 and 49. A longitudinal groove 52 is provided in the exterior of the plug preferably approximately 30° counterclockwise of the radial bore 48. A second longitudinal groove 53 extends forwardly from the radial bore 50.

By proper rotation of the plug 38 the various bores and grooves in the plug are aligned with the ports in the housing to adjust the control to settings to flush the conduits, vent the gauge tubes, open the conduits to the gauge tubes, or close the conduits and gauge tubes in a manner explained in the discussion of the operation of the invention.

Operation

I have arbitrarily designated the possible settings of the control as "off," "blow 2," "blow 1" and "gauge."

In the "off" setting, all of the hereinbefore named ports in the housing 22 are closed by engagement of the body of the plug 38 therewith; consequently all of the conduits and the arms of the gauge tube 10 are closed. The control is normally maintained in the "off" setting except when the system is being prepared for taking a reading or during the taking of the reading.

When it is desired to take a reading, it is first necessary to blow or flush the primary conduit 3, and to perform this operation the operating handle 43 is moved to the "blow 2" setting, which is the position illustrated in the drawings. The bores 48 and 49 become aligned with the ports 34 and 30, respectively, and thus the pressure conduit 7 is connected with the primary conduit 3. Air from the pressure conduit blows through the primary conduit to clean out the latter and fill the air bell 5 with air.

Also in the "blow 2" setting the bores 50 and 51 are aligned with the ports 24 and 36, respectively, and the longitudinal groove 53 connects the ports 25 and 36. Thus, the front and rear upright tubes 13 and 14 are both connected to the petcock 37 which may be opened to vent the tubes. Such venting sets the gauge at a zero reading initially so that the operator may know that the reading which appears later when the control is set to "gauge" represents only that caused by pressure of the liquid in the tank 1. Furthermore, the venting eliminates any chance of blowing out of the indicating fluid during the flushing operation. After the primary conduit has been flushed, the petcock is closed.

In installations in which the tank has an air escape open to the atmosphere, the petcock 37 may remain open at all times or else be omitted from the structure. In installations in which there is a blanket of gas under pressure over the liquid in the tank, it is necessary to keep the petcock closed except while the tubes are actually being vented in order to prevent such pressure from acting on the indicated fluid and blowing the fluid out of the tubes. Such blowing would most likely occur while the control is being turned to or from the "blow 2" position if the tubes 13 and 14 did not vent simultaneously.

In the "blow 2" setting the port 31 is closed by the body of the plug 38, Fig. 6.

The next step in the operation is to move the handle to the "blow 1" setting. At this setting, the longitudinal groove 52 connects the ports 31 and 34 and the pressure conduit 7 is thereby connected to the secondary conduit 4 for flushing the latter. The other ports are closed by the body of the plug.

The final step in taking a reading is to move the handle to the "gauge" setting. At this setting the bores 48 and 49 are aligned with the ports 30 and 25, respectively, to connect the primary conduit 3 to the rear upright tube 14 and the bores 50 and 51 are aligned with the ports 24 and 31, respectively, to connect the front upright tube 13 to the secondary conduit 4. The ports 34 and 36 are closed by the body of the plug.

When the control is set to the "gauge" setting, the pressure of the liquid in the tank acts on the rear upright tube 14 and forces the indicating fluid in the front upright tube 13 to rise an amount proportional to the depth of liquid present. The equalizer chamber 6 and secondary conduit 4 compensate any added pressures over the liquid in the tank. Thus, by observation of the height of the indicating fluid on the scale 15, one may determine the quantity of liquid present in the tank.

After completion of a reading, the handle is normally returned to the "off" setting and the petcock 37 is left in closed condition.

For simplicity in construction, the secondary conduit 4 and the equalizer chamber 6 may be omitted in installations in which there is no likelihood of additional pressures above the liquid in the container. In such cases the port 31 may either be plugged or omitted from the structure and the step of moving the handle to the "blow 1" setting is omitted.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. For use with a container adapted to receive a supply of liquid, a liquid level measuring system comprising a U-tube adapted to receive an indicating fluid, a control housing having a central bore and first and second ports, conduit means connecting said first and second ports to the opposite arms of said U-tube, said housing having third and fourth ports, conduit means connecting said third and fourth ports to the bottom and top respectively of said container, said housing having a fifth port, means on said fifth port to provide ingress from a source of gas under pressure, said housing having a sixth port providing a vent, and a control plug mounted in said housing and having a plurality of apertures therein, said plug being rotatable to a position in which the apertures therein connect said fifth port with said third port and said first and second ports with said sixth port, to a position in which one of the apertures therein connects said fifth port with said fourth port, to a position in which all of said ports are closed, and to a position in which said apertures connect said first and second ports with said third and fourth ports respectively.

2. For use with a container adapted to receive a supply of liquid, a liquid level measuring system comprising a U-tube adapted to receive an indicating fluid, a control housing having a plurality of ports, conduit means connecting a pair of said ports to the opposite arms of said U-tube, conduit means connecting another pair of said ports to the bottom and top of said container, means on another of said ports to provide ingress from a source of gas under pressure, another of said ports providing a vent, and a valve plug in said control housing provided with a plurality of passages therein, said valve plug being adjustable to a position in which said means providing ingress from the source of gas is connected to the conduit means to the bottom of said container and the arms of said U-tube are vented, to a position in which said means providing ingress from the source of gas in connected to the conduit means to the top of said container, to a position in which all of said ports are closed, and to a position in which the conduit means to the opposite arms of said U-tube are connected to the conduit means to the bottom and top of said container.

3. In a liquid level measuring system, a U-tube adapted to receive an indicating fluid, a control housing having a central bore and first and second ports, conduit means connecting said first and second ports to the opposite arms of said U-tube, said housing having third and fourth ports, conduit means adapted to connect said third and fourth ports to the bottom and top respectively of a supply of liquid, said housing having a fifth port, means on said fifth port to provide ingress from a source of gas under pressure, said housing having a sixth port providing a vent, and a control plug mounted in said housing and having a plurality of apertures therein, said plug being rotatable to a position in which the apertures therein connect said fifth port with said third port and said first and second ports with said sixth port, to a position in which one of the apertures therein connects said fifth port with said fourth port, to a position in which all of said ports are closed, and to a position in which said apertures connect said first and second ports with said third and fourth ports respectively.

4. In a liquid level measuring system, a tube adapted to receive an indicating fluid, a control having a housing provided with a plurality of ports, a pair of said ports being connected to the opposite ends of said tube, means adapted to connect another pair of said ports to the bottom and top of a supply of liquid, means on another of said ports to provide ingress from a source of gas under pressure, another of said ports providing a vent, a valve control plug in said housing provided with a plurality of passages, said control plug being adjustable to a position in which gas may be forced through the means adapted to connect the valve to the bottom of a supply of liquid and the ends of said tube are vented, to a position in which gas may be forced through the means adapted to connect the control to the top of a supply of liquid, to a position in which all of said ports are closed, and to a position in which the opposite ends of said tube are connected to the means adapted to connect the control to the bottom and top of a supply of liquid.

CARL W. PETERSON.

REFERENCES CITED

The following references are of record in the file of this patent:

UNITED STATES PATENTS

| Number | Name | Date |
|---|---|---|
| 1,420,628 | Fox | June 27, 1922 |
| 2,129,231 | Parket | Sept. 6, 1938 |

FOREIGN PATENTS

| Number | Country | Date |
|---|---|---|
| 333,512 | Great Britain | Aug. 6, 1930 |